United States Patent Office 3,249,378
Patented May 3, 1966

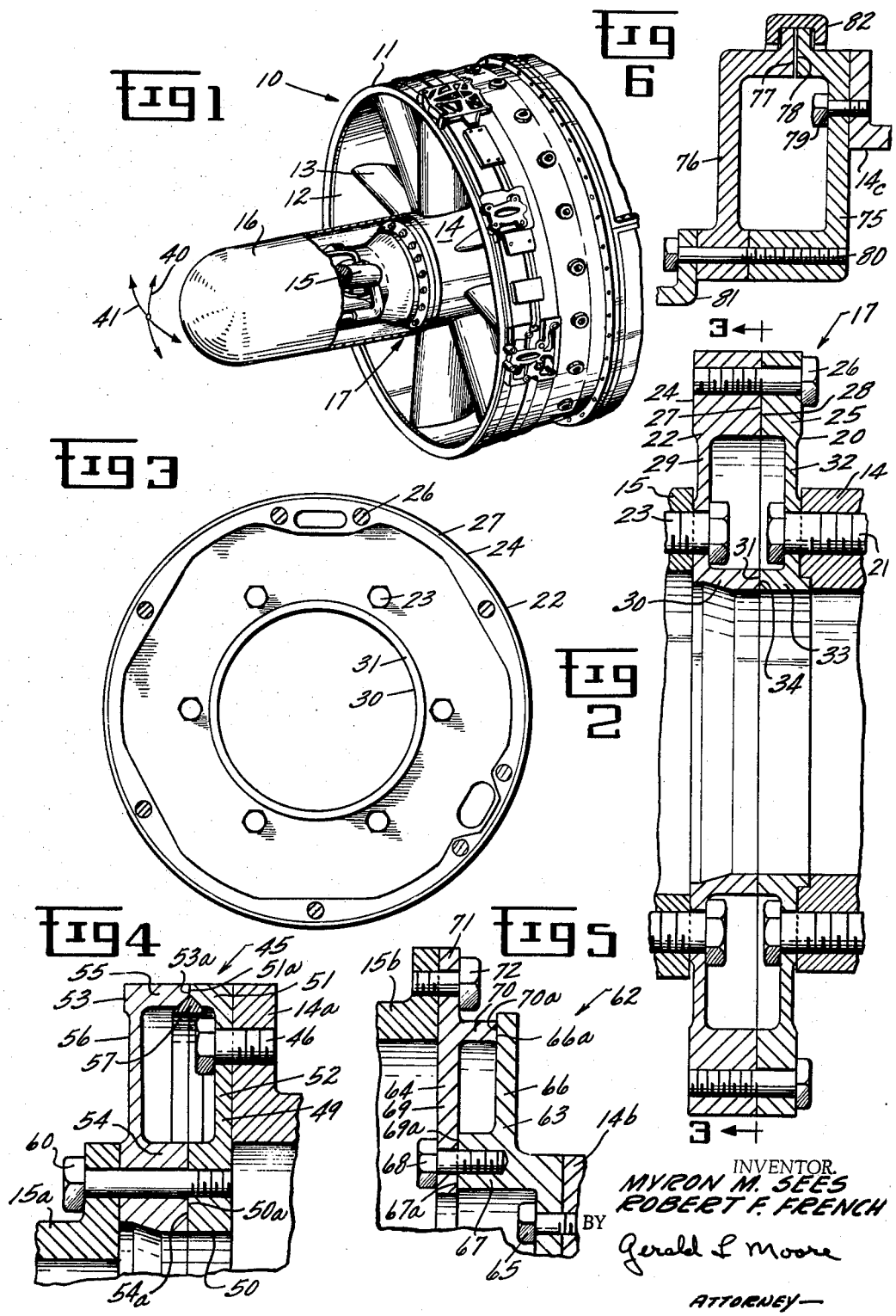

3,249,378
SUPPORT SYSTEM
Myron M. Sees and Robert F. French, Cincinnati, Ohio, assignors to General Electric Company, a corporation of New York
Filed Dec. 30, 1963, Ser. No. 334,180
4 Claims. (Cl. 287—129)

This invention relates to a support system and more particularly, to such a system which dampens and limits vibration between the supported and supporting members.

In many applications and especially in aircraft engines, certain apparatus and accessories must be rigidly supported within the structure for proper alignment of drive shafts, hydraulic connections, etc. However, in applications like aircraft gas turbines where vibration of the engine must be contended with, to rigidly support accessories such as constant speed drives, fuel pumps and such apparatus on the engine allows the vibratory motion of the engine to be transmitted directly to the apparatus which can result in failure or malfunction of the accessory. Also the critical frequency of the accessory may frequently be very near the frequency of the engine vibration thereby allowing the transference of vibratory motion from the engine to the accessory to be much more pronounced.

It is therefore one object of this invention to provide a support system for connecting two members which dampens vibration transmitted between the members and in addition may be tuned to alter the critical frequency of the supported assembly in a manner to move it away from the vibration frequency range of the supporting member.

It is another object of this invention to provide a support system for mounting accessories on engines for dampening vibrations transmitted between the engine and the accessory and to alter the critical frequency of the supported assembly to remove it from the normal range of vibration of the engine.

In carrying out these and other objects of this invention, there is provided a support system comprising first and second members coupled together and including means for fastening one member to the supporting apparatus and the second member to the supported apparatus, with each member including a detuning web extending transverse to the direction of normal vibratory movement so as to flex and detune the supported assembly comprising the support system and the supported apparatus, adjusting its critical frequency away from the normal vibration frequency of the supporting apparatus and including a preloaded abutting surface between the first and second members for damping differential movement between the supported and supporting apparatus.

Other objects and many of the attendant advantages of this invention will be readily appreciated as the same becomes better understood by reference to the following detailed description when considered in connection with the accompanying drawings wherein:

FIG. 1 is a perspective view, partially in section, of a portion of a turbojet engine with an attached accessory supported from the engine by the support system invention, FIG. 2 is an enlarged cross-sectional view of the support system, FIG. 3 is a side view of one of the support members, taken one line 3—3 of FIG. 2, FIG. 4 illustrates a partial cross-sectional view of a second embodiment of this invention, FIG. 5 illustrates a partial cross-sectional view of a third embodiment of this invention, and FIG. 6 is a partial cross-sectional view of a fourth embodiment of the invention.

Referring now to the drawings, FIG. 1 illustrates a portion of a turbojet engine 10 comprising a casing 11 defining an air inlet 12 in which is positioned struts 13 extending from the casing to a hub 14. Supported from the hub is an accessory 15 such as a constant speed drive which is enclosed by a bullet nose shield 16. In this embodiment the engine comprises the supporting apparatus and the accessory is the supported apparatus. Two main problems exist in attaching the accessory to the engine in this position. Firstly, due both to the normal engine vibratory motion and the weight of the accessory supported in this cantilevered manner, the accessory will attempt to pivot about the midpoint of where it is supported on the hub 14. Secondly, this motion of the accessory is accentuated by the critical frequency of the accessory lying within the range of the engine vibrating frequencies. The critical frequency of the accessory being that frequency at which the accessory responds to the vibratory excitation with the greatest vibratory motion. To overcome these difficulties the accessory 15 is attached to the hub 14 by a support system 17, the enlarged cross-section of which is illustrated in FIG. 2. In that drawing a portion of the hub 14 is illustrated attached to a ring or web member 20 by means of a series of bolts 21 with a portion of the accessory 15 illustrated attached to a ring or web member 22 by means of bolts 23. As illustrated in FIG. 3 the web or support member 22 and the web or support member 20 in the preferred embodiment have an annular configuration similar to a disk and are attached together by a series of bolts 26. The bolts 26 join these support members 20 and 22 with adjacent plane surfaces 27 and 28 abutting. The support member 22 comprises a web 29 and an axially extending portion 30 including a plane surface 31. Similarly, member 20 comprises a web 32 and axially extending portion 33 having a plane surface 34 thereon. When these web members are joined surfaces 31 and 34 abut similarly to surfaces 27 and 28.

Turning now to the operation of this support system, for illustration purposes the longitudinal axis will be referred to as extending along the center of the cylinder formed by the casing 11 of the turbojet. Because a portion of the turbine or supporting member in this instance rotates, a vibratory motion is imparted to the accessory 15 to cause movement transverse to this longitudinal axis, or generally in the directions illustrated by arrows 40 and 41. Because of this pivoting movement of the accessory, the surface of the accessory adjacent and parallel to the hub 14 will attempt to move toward and away from the hub. However, as seen in FIG. 2 the webs 29 and 32 extend transverse to the longitudinal axis of the turbojet and substantially parallel to each other. With the accessory attempting to pivot about the hub 14 the webs 29 and 32 extend transverse to the direction in which the accessory 15 is attempting to move relative to the supporting member or engine 10. The webs may therefore flex a predetermined amount allowing some differential movement between the outer ring 24 and the inner ring 30 and between the outer ring 25 and the inner ring 33; however, such flexing will dampen vibratory movement with respect to the turbine of the supported assembly comprising the support system and the accessory. The physical characteristics of the webs 29 and 32 connecting these outer and inner rings of each support member further determines the critical frequency of this supported assembly such that by changing the thickness or (and) length or flexibility of these webs the critical frequency of the supported body may be altered away from the normal vibrating frequency of the engine 10 to limit any vibratory movement therebetween. This is referred to as tuning the supported assembly.

A further dampening and tuning effect is obtained by preloading or stressing the joint formed by plane surfaces 31 and 34 by the relative axial positioning of the surfaces 27 and 31 on the support member 22 and similarly the positioning of surfaces 28 and 34 on the support member 20. By allowing the surface 31 to extend further from the web 29 than the surface 27, and similarly allowing the surface 34 to extend further from the web 32 than the surface 28, the distance between the respective web portions adjacent the outer ring or collar portions 24 and 25 is made slightly less than the same distance adjacent the inner support member ring or collar portions 30 and 33. When the bolt fastener 26 is tightened this preloads the abutting surfaces 31 and 34 in a manner such that only at higher vibrating frequencies and (or) loadings will these surfaces separate due to vibratory movement between the hub 14 and the accessory 15. By increasing or decreasing such preloading the support system may be tuned to act as a solid body at different frequencies to alter the critical frequency of the supported assembly such that it lies outside the normal vibrating frequency of the engine 10. For instance, if the critical frequency of the supported assembly is 70 cycles per second and the normal vibrating frequency of the hub 14 is 70 cycles per second a resonant condition exists and high response in the form of vibratory motion transmitted between the hub and assembly will result. However, by proper preloading of the abutting members 30 and 33 vibratory motion can be prevented from separating the surfaces 31 and 34 under the normal hub frequency of 70 cycles per second as the critical frequency of the supported member has been changed to possibily 100 cycles per second thereby detuning or setting apart the critical frequency of the supported apparatus and the operating frequency of the supporting assembly in a manner to limit vibratory movement therebetween. A further damping effect is obtained when the abutting surfaces 31 and 34 do separate in that the critical frequency of the supported assembly becomes a function of the response vibratory amplitude and therefore the frequency with which the supported assembly is resonant changes with amplitude and detunes from the exciting frequency thereby limiting vibratory movement therebetween.

Turning now to FIG. 4 therein is illustrated a second embodiment of the invention comprising a support system 45 connecting a supporting apparatus 14a corresponding to the hub 14 of the first embodiment, and a supported apparatus 15a corresponding to the accessory 15 of the first embodiment. This support system consists of member 49 attached to the supporting apparatus 14a by bolt 46 and comprising an inner ring or collar 50 and an outer ring or collar 51 connected by web 52. Web member 53 consists of an inner ring or collar 54 and an outer ring collar 55 connected by web 56. These support members include abutting surfaces 51a and 53a between the rings 51 and 53 and abutting surfaces 50a and 54a between the members 50 and 54. In the same manner as the first embodiment the substantially parallel webs 52 and 56 extend transverse to the direction of vibratory movement between the members 14a and 15a in a manner to allow adjustment of the resonant frequency of the supported apparatus 15a and support system 45 by altering the physical characteristics of the webs 52 and 56. Also a friction ring 57 may be inserted as illustrated to rub against members 51 and 55 to further dampen relative movement therebetween. This embodiment further differs in that the support members 49 and 53 are fastened together by bolts 60 which also attach the support member 15a to the support system. In this embodiment the preloaded joint is that formed by the surfaces 51a and 53a on the outer rings of the support system with the amount of preloading determined by the distance that the inner and outer rings on each support member extend axially from the connecting webs. The general operation of this embodiment is similar to that of the first embodiment.

In FIG. 5 a supported apparatus 15b is attached to the supporting apparatus 14b by a support system 62. This support system consists of web members 63 and 64 having abutting surfaces with web member 63 attached to 14b by means of bolts 65. The web member 63 includes a web 66 extending from an inner ring 67 with this inner ring having a surface 67a and being attached by bolts 68 to web member 64. Web member 64 comprises a web 69 including a surface 69a, abutting surface 67a, an outer ring 70 and outer member 71 attached to the supported apparatus 15b by bolts 72. In this embodiment only the web 69 extends between the supporting and supported apparatus. Abutting surfaces 66a and 70a may be preloaded by proper dimensioning of the ring 67 extending from the web 66 such that when tightening the bolt 68 the abutting surfaces 66a and 70a are forced together prior to the abutting surfaces 67a and 69a on the web 69 and the inner ring 67 due to the ring or collar 70 being longer—axially—than the ring or collar 67. In this manner the preloaded joint formed by 66a and 70a is provided as well as the transverse web 69 extending between the supported and supporting members for tuning the supported assembly and dampening any vibratory motion transmitted from the supporting member.

In FIG. 6 is illustrated a different embodiment of the invention employing the principles in a different sequence. Web or support members 75 and 76 are illustrated having adjacent surfaces 77 and 78. Support member 75 is attached to a supporting apparatus 14c by a series of bolt fasteners such as the bolt 79 while the bolt 80 and others not shown fastens the support members 75 and 76 to the supported member 81. A member 82 having a U-shaped cross-section is employed which may be a complete ring or a portion thereof having an internal dimension greater than the width of the contained portions of the support members 75 and 76 to form a ring engaging member to limit differential movement of said support members. In this embodiment the preloading of these adjacent surfaces 77 and 78 is obviously zero since they are spaced apart however upon differential movement of the supported and supporting members responsive to a vibratory excitation, these surfaces will be caused to move apart and together until at a predetermined differential movement between the members the surfaces will contact adding stiffness to the system and changing the critical frequency away from that frequency presently exciting the members. It is obvious that this is an extension of the same concept of the previously explained embodiments.

It may be seen that in each embodiment there is provided means for altering the critical frequency of the supported assembly by proper dimensioning of the web or webs within the supporting system. Also in the preloaded joint within the supporting system and the web members a damping function is provided with the system to damp vibratory movement between the supported and supporting members. While particular embodiments of the invention have been illustrated and described, it will be obvious to those skilled in the art that various changes and modifications may be made without departing from the invention and it is intended to cover in the appended claims all such changes and modifications that come within the true spirit and scope of the invention.

What is claimed as new and desired to be secured by Letters Patent of the United States is:

1. A vibration dampening support system for use with supporting and supported apparatus comprising:
    a pair of annular support members, each support member having a relatively flexible radially-extending web portion, with the web portion of one member being substantially parallel to the web portion of the other member, each web portion having on one side thereof an annular rigid axially-extending collar at the inner and outer periphery thereof, the inner and outer collars of one support member being in axial alignment with and in juxtaposition to the respective inner and outer collars of the other member;

first means on each support member fastening each support member to a respective one of the said supported and supporting apparatus;

second means fastening one of the pairs of axially-aligned collars at one of said inner and outer peripheries of said web portions together in end-to-end abutting relationship, with the axial extension of the collar at the other of said inner and outer peripheries of at least one of said web portions being greater than the axial extension of the other collar of its respective web portion and with the collars at the other of said inner and outer peripheries also being in end-to-end abutting relationship so that, under load, flexing of said web portions to dampen transmission of vibratory motion between said supported and supporting apparatus is controlled by adjustment of the critical frequency of the supporting apparatus due to pre-loading of the support members.

2. A vibration dampening support system for use with supporting and supported apparatus comprising:

a pair of annular support members each having a relatively flexible radially-extending web portion having an inner and an outer periphery with the web portion of one support member being substantially parallel to the web portion of the other member, each web portion having on one side thereof an annular rigid axially-extending collar thereon adjacent one of its peripheries, with the axes of said collars being substantially parallel to each other and normal to a plane passing through both collars and with the axial extent of the collar of one web portion being greater than the axial extent of the collar of the other web portion, each of said collars being in juxtaposition to and engaging the web portion of the other support member adjacent the other of said peripheries of the web portion of said other support member;

first means on each support member fastening each support member to a respective one of the said supported and supporting apparatus;

second means fastening said support members together at one of said collars with the collar of each of said support members abutting said other support member adjacent said other periphery of the web portion thereof, the axial distance between the web portions of said members adjacent said one of said collars being less than the axial distance between the web portions adjacent said other of said collars so that, under load, flexing of said web portions to dampen transmission of vibratory motion between said supported and supporting apparatus is controlled by adjustment of the critcal frequency of the support system and supported apparatus relative to the vibrating frequency of the supporting apparatus due to pre-loading of the support members at said other of said collars.

3. A vibration dampening support system for use with supporting and supported apparatus comprising:

a pair of annular support members, each support member having a relatively flexible radially-extending web portion, with the web portion of one member being substantially parallel to the web portion of the other member, each web portion having on one side thereof an annular rigid axially-extending collar at the inner and outer periphery thereof, the inner and outer collars of one support member being in axial alignment with and in juxtaposition to the respective inner and outer collars of the other member;

first means fastening one of said support members to one of said supported and supporting apparatus;

second means fastening the other of said support members to the other of said supported and supporting apparatus and also fastening said support members to each other at the axially-aligned pair of collars of one of said inner and outer peripheries, said collars of said one of said peripheries being in end-to-end abutting relationship, the axial extent of the collar at the other of said peripheries of at least one of said web portions being greater than the axial extent of the other collar of its respective web portion and with the collars at the other of said inner and outer peripheries also being in end-to-end abutting relationship with the axial distance between the web portions of said members adjacent said one of said peripheries being less than the axial distance between the web portions adjacent said other of said peripheries so that, under load, flexing of said web portions to dampen transmission of vibratory motion between said supported and supporting apparatus is controlled by adjustment of the critical frequency of the support system and supported apparatus relative to the vibrating frequency of the supporting apparatus due to pre-loading of the support members at said other of said peripheries.

4. The invention according to claim 3 including a ring member having an external peripheral configuration adapted to be received in and closely mate with a notch at the joint of the other pair of axially-aligned collars at the other of said peripheries, said ring member frictionally engaging both of said support members at said notch for further limiting of transmission of vibratory motion therebetween.

References Cited by the Examiner

UNITED STATES PATENTS

| | | | |
|---|---|---|---|
| 349,365 | 9/1886 | Roots | 287—129 |
| 1,664,052 | 3/1928 | Ungar | 64—13 |
| 1,976,797 | 10/1934 | Naylor | 285—368 |
| 2,891,746 | 6/1959 | Pesel | 248—15 |
| 2,934,367 | 4/1960 | Gaubatz | 248—15 X |

CARL M. TOMLIN, *Primary Examiner.*

I. B. TALTON, C. B. FAGAN, A. V. KUNDRAT,
*Assistant Examiners.*